Sept. 15, 1970  C. VAN DER LELY ET AL  3,528,228
MOWING MACHINES
Filed June 13, 1967  3 Sheets-Sheet 1

INVENTORS
CORNELIS VAN DER LELY
ARY VAN DER LELY
BY
Mason, Mason & Albright
Attorneys INVENTORS
CORNELIS VAN DER LELY
ARY VAN DER LELY
BY
Mason, Mason & Albright
Attorneys

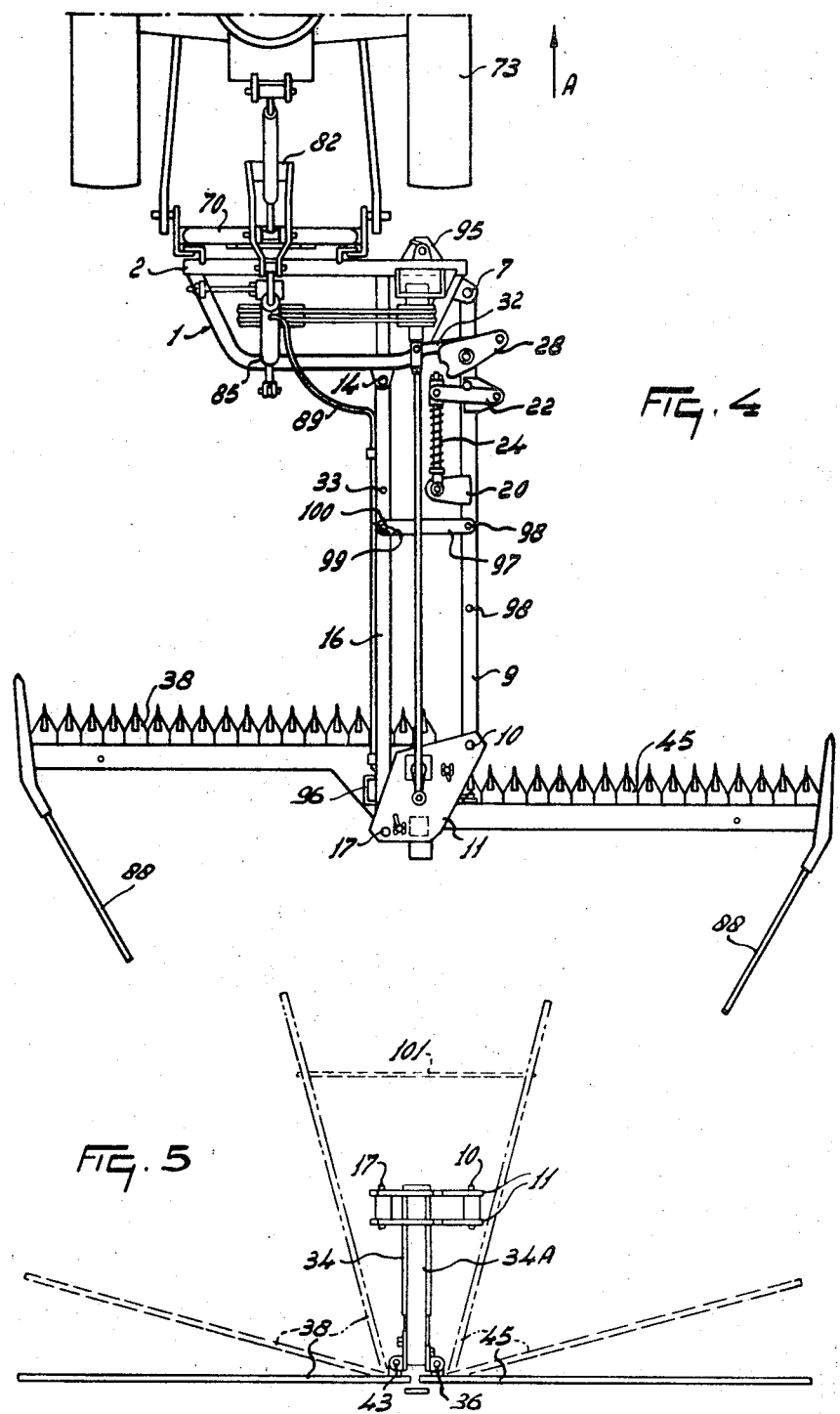

United States Patent Office 3,528,228
Patented Sept. 15, 1970

3,528,228
MOWING MACHINES
Cornelis van der Lely, Bruschenrain 7, Zug, Switzerland, and Ary van der Lely, Weverskade 10, Maasland, Netherlands
Filed June 13, 1967, Ser. No. 645,641
Claims priority, application Netherlands, June 17, 1966, 6608501
Int. Cl. A01d 75/30, 35/02
U.S. Cl. 56—6
28 Claims

ABSTRACT OF THE DISCLOSURE

This invention is a mowing machine in which a frame supports two or more mowing bars laterally of the frame and on the same side of the prime mover during mowing operation. The mowing bars are arranged side-by-side and a pivotable parallelogram linkage connects the mowing bars to the frame. A displaceable retaining member is included with other supporting elements, which retaining member can be tripped by one of the bars striking an obstacle whereupon the linkage is displaced and the mowing bars can be moved to the rear. The frame is connectable to the three-point lifting mechanism of a tractor and power means are associated with the lifting mechanism to raise the mowing bars at the same time the lifting mechanism is operated. The entire parallelogram linkage with mowing bars can be pivoted to several transport positions of less width than the mowing position.

---

This invention relates to mowing machines of the kind having a frame and two mowing beams which, during use of the machine, are located in substantially side-by-side relationship.

According to the invention, there is provided a mowing machine of the kind set forth and comprising a coupling member adapted for connecting the frame to a tractor or other operating vehicle, the mowing beams being so arranged relative to the frame that, during use of the machine, they are both located at the same side of the path of travel of the tractor or other operating vehicle.

Figure 1:
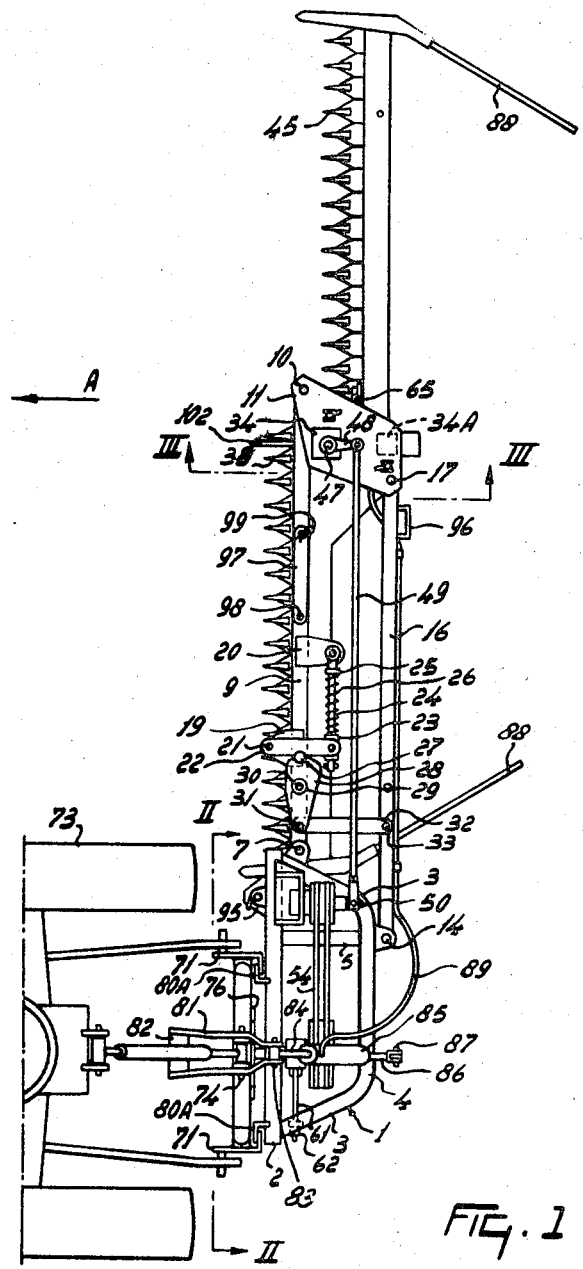
Figure 2:
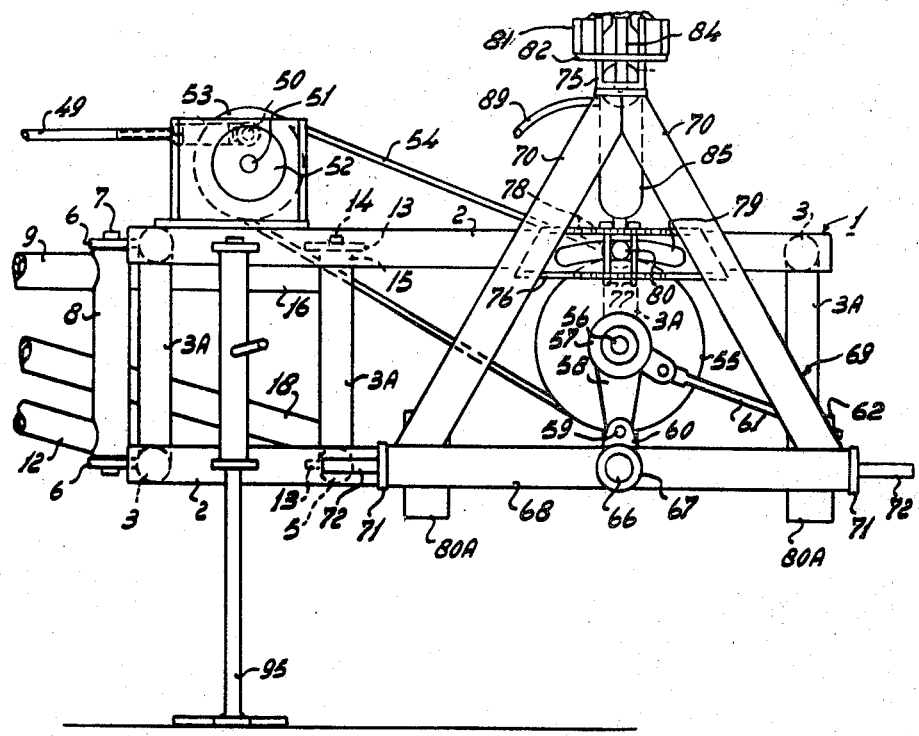
Figure 3:
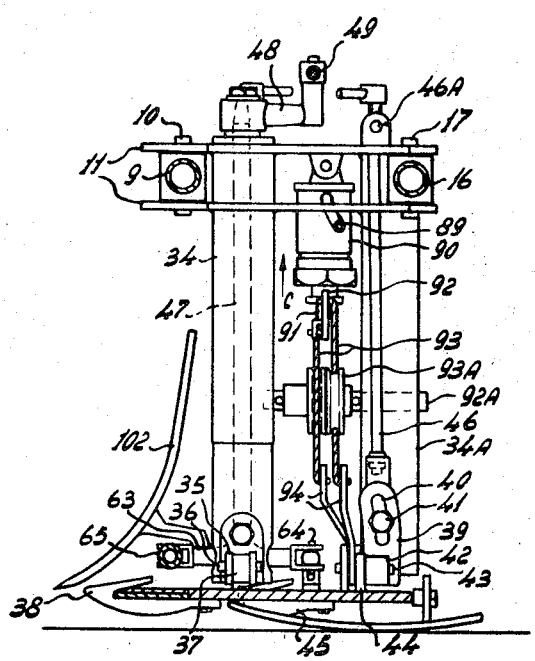

For a better understanding of the invention, and to show how the same may be carried into effect, reference will now be made, by way of example, to the accompanying drawings, in which:

FIG. 1 is a plan view of a mowing machine in accordance with the invention coupled to the rear of an agricultural tractor, FIG. 2 is an elevation, to an enlarged scale, as seen in the direction indicated by the arrows II—II in FIG. 1, FIG. 3 is a section, to an enlarged scale, taken on the line III—III in FIG. 1, FIG. 4 is a plan view showing the mowing machine coupled to the rear of an agricultural tractor and occupying a first transport position, and FIG. 5 is a diagrammatic rear elevation corresponding to FIG. 4 but also showing a second transport position in which the mowing machine is of reduced width as compared with the first transport position.

Referring to the drawings, the mowing machine which is illustrated has a frame 1 that includes two horizontal frame beams 2 that lie one above the other, the upper frame beam 2 being arranged between the opposite ends of a shallow U-shaped frame beam 3 that is contained in substantially the same horizontal plane as the upper beam 2. A second shallow U-shaped frame beam 3 is arranged beneath the one which has just been mentioned so as to interconnect the opposite ends of the lower of the two frame beams 2. The rectilinear base portions 4 of the two beams 3 extend parallel to the beams 2. Two horizontal beams 5 that extend substantially parallel to the intended direction of travel of the mowing machine which is indicated by the arrow A in FIGS. 1 and 4 of the drawings perpendicularly interconnect the lower one of the two beams 2 and the base portion 4 of the corresponding U-shaped beam 3 in such a way that the junctions of the beams 5 with the base portion 4 are located close to the relatively opposite ends of said portion. The beams 3 are interconnected by vertically extending beams 3A.

Lugs 6 project from the upper and lower frame beams 3 towards the leading ends of one limb of each of those beams. A vertical shaft 7 is supported by the two lugs 6 and a sleeve 8 is turnable about the shaft 7 between the lugs 6. A substantially horizontal beam 9 has one end secured to the sleeve 8 adjacent the uppermost end of the latter, the relatively opposite end of the beam 9 carrying a vertical sleeve which is arranged around a substantially vertical pivot pin 10 between upper and lower horizontal plates 11. An inclined strengthening beam 12 (FIG. 2) interconnects the lower end of the sleeve 8 and the lower side of the beam 9 at a point (not visible) close to the two plates 11. Two lugs 13 project rearwardly from the two rectilinear base portions 4 of the two frame beams 3 at locations adjacent the ends of said portions that are closest to the lugs 6. A vertical shaft 14 is supported by the two lugs 13 and a sleeve 15 is turnable about this shaft between said lugs 13. A beam 16 interconnects the upper end of the sleeve 15 and a vertical pivot pin 17 disposed between the two plates 11 at a distance from the pivot pin 10. An inclined strengthening beam 18 interconnects the lower end of the sleeve 15 and a point (not visible) located at the lower side of the beam 16 adjacent to the two plates 11. It will be noted that the substantially vertical axes afforded by the shafts 7 and 14 and pivot pins 10 and 17 are located at the four corners of an angularly adjustable parallelogram.

The horizontal beam 9 carries a support 19 and also a further relatively spaced support 20. A retaining member 22 has one of its ends turnably connected to the support 19 with the aid of a substantially vertical pivot pin 21, the relatively opposite end of the retaining member 22 being pivotally connected to a slider 23. The slider 23 is movable axially of a rod 24 one end of which is pivotally connected to the support 20. A helical compression spring 26 is wound around the rod 24 and bears between the slider 23 and a ring 25 which latter is adjustable in position axially of the rod 24 with the aid of a screw-threaded nut which is not shown in the drawings but which lies between the ring 25 and the support 20. It will be appreciated that this nut can be moved axially of the rod 24 to determine the initial degree of compression of the spring 26. The edge of the retaining member 22 which is furthest from the support 20 is provided approximately midway along its length with a projection 27 that is adapted to lodge in a recess formed in the end of an arm 28 that is turnable about an upright shaft 30 with the aid of a substantially vertical bearing 29. The upright shaft 30 about which the arm 28 is turnable is fastened to the beam 9, the end of the arm 28 remote from the recess which has just been mentioned being pivotally connected by a vertical pin 31 to one end of a link 32. The opposite end of the link 32 is, in turn, turnably connected to the beam 16 with the aid of a vertical pivot pin 33.

The horizontally disposed but vertically spaced plates 11 are formed with aligned substantially square openings through which a similarly shaped (in cross-section) box-like housing 34 is entered. As can be seen in FIG. 3 of the drawings, the uppermost end of the housing 34 is located just above the upper one of the two plates 11 and its lowermost end is located a considerable distance beneath the lower one of the two plates 11. A fork 35 is bolted to the housing 34 adjacent the bottom thereof so as to project forwardly in the direction A from said housing. A substantially horizontal pivot pin 36 extends between the limbs of the fork 35 and a lug 37 is turnable thereabout between said limbs, the lug being fastened to the finger bar of a mowing beam 38 that extends substantially perpendicular to the direction of travel A when it occupies the operative position shown in FIG. 1 of the drawings. A second housing 34A is located behind the housing 34 relative to the direction A and is secured to the upper one of the two plates 11. The housing 34A is of the same shape and height as the housing 34 and is provided near its lower end with a support 39 that is fastened to one of its vertical sides by a bolt 41. The shank of the bolt 41 is screw-threaded into the wall of the housing 34A and is entered through a gently curved slot 40 formed in the support 39 so that relative adjustments of the positions of the support 39 and housing 34A can be made.

A lug 52 projects frowardly of the machine from the lowermost end of the support 39, said lug being turnably connected to a further lug 44 projecting upwardly from the finger bar of the mowing beam 38 with the aid of a horizontal shaft 43. The pivot pin 36 and horizontal shaft 43 are coaxial. A second mowing beam 45 is pivotally connected to the housing 34 and 34A at the sides of those housings that are remote from the ones which can be seen in FIG. 3 of the drawings. However, in the case of the second mowing beam 45, a part corresponding to the fork 35 is connected to the housing 34A and a part corresponding to the support 39 is connected to the housing 34. Said parts corresponding to the fork 35 and support 39 are linked with the finger bar of the second mowing beam 45 in such a way that, relative to the direction A, the second mowing beam 45 is located rearwardly to the first-mentioned mowing beam 38. The support 39 is fastened to the lowermost end of a vertically extending screw-threaded spindle 46 whose uppermost end can be rotated in the plates 11 to move the support 39 relative to the housing 34A with the aid of the slot 40 and the bolt 41. The spindle 46 can be fixed in a chosen setting with the aid of a bolt 46A. Parts that are substantially identical to the parts 46 and 46A are provided in respect of the part corresponding to the support 39 that is connected to the lowermost end of the housing 34. Only the uppermost end of the part corresponding to the spindle 46 can be seen in FIGS. 1 and 3 of the drawings.

A shaft 47 is located within the housing 34 so as to extend substantially vertically and substantially axially of said housing. An arm 48 projects rearwardly, relative to the direction A, from the upper end of the shaft 47, the free end of the arm 48 being pivotally connected to one end of a connecting rod or pitman 49. The opposite end of the connecting rod or pitman 49 is turnably mounted on a horizontal crank pin 50 that is eccentrically connected to a horizontal shaft 51 journalled in a bearing 52 fastened to the upper one of the frame beams 2. The shaft 51 carries a double pulley 53 that is in driven connection, by way of twin V-belts, ropes or the like 54, with a double pulley 55 mounted on a substantially horizontal shaft 56 which extends parallel to the direction A. The shaft 56 is journalled in a bearing 57 carried at the upper end of an arm 58 the lowermost end of which is turnably connected by a horizontal pivot pin 59 to a lug 60 carried by the lower one of the two frame beams 2. The bearing 57 is pivotally connected to one end of a rod 61, said rod being screw-threaded at its opposite end and provided with a nut 62 adapted to bear against a bracket carried by the lower one of the two frame beams 3, through which bracket the rod 61 is entered, to enable the bearing 57 to be turned about the pivot pin 59 to increase or decrease the tension in the double belts or the like 54 as required.

The lowermost end of the shaft 47 which is located within the housing 34 carries two aligned arms 63 (FIG. 3), the ends of these arms 63 that are remote from the shaft 47 being connected by corresponding vertical pins 64 to corresponding rods 65 that are secured to the cutter blades or knife beams of the mowing beams 38 and 45 respectively. The lower one of the two frame beams 2 is provided with a substantially horizontal bearing 67 in which a shaft 66 is journalled, said shaft being secured to a substantially horizontal beam 68 that forms part of a coupling member generally indicated in FIG. 2 of the drawings by the reference numeral 69. The coupling member 69 also includes two upwardly converging beams 70 whose lowermost ends are connected to the opposite ends of the beam 68 and whose uppermost ends are rigidly interconnected. The opposite ends of the beam 68 carry plates 71 from which horizontally aligned pins 72 project in relatively opposite directions. The rigidly interconnected upper ends of the two beams 70 carry a bracket 75 the vertically extending limbs of which are formed with at least one pair of horizontally aligned holes.

When the mowing machine is in use as illustrated in FIGURE 1 of the drawings, the two pins 72 are pivotally engaged with the free ends of the lower lifting links of the three-point lifting device or hitch of an agricultural tractor such as the tractor 73 which is diagrammatically illustrated in FIG. 1. The free end of the adjustable upper lifting link of the three-point lifting device or hitch is pivotally connected by a horizontal pivot pin 74 to the bracket 75 with the aid of the holes formed in the limbs of that bracket. A beam 76 of channel-shaped cross-section horizontally interconnects the two beams 70 of the coupling member 69, the limbs of the beam 76 being horizontally disposed and being formed with rows of holes 78 which are aligned in vertical pairs. The vertically extending web of the beam 76 is formed with an arcuate slot 79 the center of curvature of which is coincident with the longitudinal axis of the shaft 66. A horizontal pin or dowel 80 projects forwardly from the upper one of the two frame beams 2 and is entered through the slot 79. The relative angular setting, about the axis afforded by the shaft 66, of the coupling member 69 to the frame 1 can thus be determined by the position of the pin or dowel 80 longitudinally of the slot 79. Chosen positions of said pin or dowel 80 can be maintained with the aid of two vertical pins 77 that are entered through appropriate pairs of the holes 78 at opposite sides of the pin or dowel 80 as shown in FIG. 2 of the drawings. As can be seen best in FIG. 1 of the drawings, the rearmost ends of the two plates 71 are bent over towards one another and co-operate with L-shaped (in plan view) brackets 80a that project forwardly from the lower of the two frame beams 2 in transmitting tractive effort effectively from the tractor 73 to the frame 1 of the machine.

Two relatively spaced arms 81 are turnable about the horizontal pivot pin 74, the foremost ends of said arms 81 being interconnected by a plate 82 which, during operation of the mowing machine, is located beneath the adjustable upper lifting link of the three-point lifting device of the tractor 73. The opposite and rearmost ends of the two arms 81 are interconnected by a horizontal pivot pin 83 (FIG. 2) to which pivot pin the free end of a piston rod 84 is also turnably connected. The piston rod 84 is connected to a piston that is reciprocable in a pump cylinder 85 that is turnably connected to a plate mounted on the base portion 4 of the upper frame beam 3 with the aid of a projecting arm 86 and a horizontal pivot pin 87. The interior of the cylinder 85 is in communication by way of a duct 89 with a cylinder 90 (FIG. 3) which is disposed beneath the upper one of the two plates 11 between the housings 34 and 34A. A piston reciprocable in the cylinder 90 and has a downwardly directed piston rod 91 carrying wings 92 to which ropes, cables or the like 93 are secured. Each rope, cable or the like 93 passes around a corresponding pulley 93A and has its opposite end connected to one of two arms 94 projecting upwardly from the respective mowing beams 38 and 45. Each pulley 93A is rotatable about a shaft 92A. The arms 94 are pivotally mounted and are arranged to be moved by the ropes, cables or the like 93 into contact with stops. A supporting foot 95 is connected to the frame beams 2 in such a way that it can occupy a vertically retracted postion when the mowing machine is in use or a downwardly extended position (as shown in FIG. 2 of the drawings) to support the frame 1 above the ground when the coupling member 69 is not connected to the tractor 73.

In the use of the mowing machine which has been described, the coupling member 69 is connected to the three-point lifting device or hitch of the tractor 73 in the manner which has been described and the leading end of the shaft 56 is placed in driven connection with the power take-off shaft of the tractor 73 in a conventional manner with the aid of, for example, a telescopic transmission shaft having universal points at its opposite ends. The connecting rod or pitman 49 causes the shaft 47 to oscillate about its own longitudinal axis and this movement is transmitted to the cutter blades or knife beams of the mowing beams 38 and 45 by the arms 63 so that said cutter blades or knife beams reciprocate relative to the respective finger bars. It will be noted that the arrangement is such that, at any given instant, the two cutter blades or knife beams are moving in relatively opposite directions. The two mowing beams 38 and 45 are located side-by-side and both at the same side of the path of travel of the tractor 73. The mowing beams can readily match undulations in the surface of the ground over which they are moving by turning about the axes afforded by the pins 36 and shafts 43 which parts connect said mowing beams to the supporting housings 34 and 34A respectively. If one or both of the mowing beams should meet an obstacle which is immovable and which cannot be avoided by a pivotal movement of the kind which has just been mentioned, the aforementioned parallelogram linkage is displaced rearwardly about the axes afforded by the shafts 7 and 14. The spring 26 resists deformation of the parallelogram linkage in this way but, when a substantially immovable obstacle is met, the spring 26 is compressed and the projection 27 rides up out of the cooperating recess in the end of the arm 28 whereafter said projection slides around the curved portion of the arm 28 that can be seen in FIG. 1 of the drawings. The mowing beams 38 and 45 thus yield rearwardly to avoid the obstacle and, as soon as the obstacle has been passed, the mowing beams can be manually reset in their correct operating position which will tend to be maintained by the re-entry of the projection 27 in the recess of the arm 28. The "back-break" safety arrangement which is afforded by the parallelogram linkage has the advantage that no matter at what point along the length of the two mowing beams 38 and 45 a force resisting progress of those mowing beams is applied, said force must have the same magnitude before it will cause said mowing beams to yield rearwardly. As can be seen in FIG. 1 of the drawings, the longer sides of the parallelogram linkage normally extend substantially horizontally and substantially perpendicular to the direction A.

When the bolt which secures the fork 35 (FIG. 3) to the housing 34 is loosened, the screw-threaded spindle can be operated to pivot the mowing beam 38 about the axis of said bolt (which axis is parallel to the length of the mowing beam) to adjust the level at which the crop will be cut. It can be seen in FIG. 3 of the drawings that the center of curvature of the arcuate slot 40 coincides with the axis of the bolt securing the fork 35 to the housing 34. The equivalent parts which are not visible, or fully visible, in the drawings can be employed in exactly the same way to tilt the second mowing beam 45 about an axis extending parallel to its own length. When the mowing machine is to be transported from one place to another without performing any cutting operation, it may be placed in the first transport position which can be seen best in FIG. 4 of the drawings. This may be accomplished manually with the aid of a handle 96 carried by the beam 16. In the first transport position, both mowing beams 38 and 45 are located wholly to the rear of the tractor 73. In order to enable the position shown in FIG. 4 to be reached from the working position shown in FIG. 1, the link 32 is disconnected from the pivot pin 33 and, when the position of FIG. 4 is reached, it is maintained by employing a second link 97 one end of which is pivotally connected to the beam 9 by a pin 98. The opposite end of the link 97 is engaged with a pin 100 carried by the beam 16, a resilient retaining clip 99 or the like being entered through a transverse bore at the upper end of the pin 100 to prevent the link 97 accidentally becoming disengaged therefrom. When the mowing machine occupies its operative position as shown in FIG. 1 of the drawings, the link 97 lies on top of, and parallel to, the beam 9, the end of said link which was engaged with the pin 100 being engaged with a second pin 98 and the clip 99 being employed to maintain such engagement. A second transport position of considerably reduced width can be reached from the first transport position illustrated in FIG. 4 by tilting both the mowing beams 38 and 45 upwardly until the position shown in broken lines in FIG. 5 is reached. This position is maintained with the aid of a hooked fastening member 101.

The lifting mechanism which is afforded by the cylinder 85 and associated parts can be employed to tilt the mowing beams 38 and 45 upwardly to some extent about the pins 36 and shafts 43 to, for example, the intermediate raised position which is shown in broken lines in FIG. 5. Upon raising the three-point lifting device or hitch of the tractor 73, the plate 82 is contacted by the upper link of said lifting device thus turning the arms 81 about the pin 74 in a direction such that the piston rod 84 is moved upwardly in the cylinder 85 to supply oil or other fluid pressure medium along the duct 89 to the cylinder 90. The cylinder 90 is so arranged internally that the supply of fluid thereto from the duct 89 causes the piston rod 91 to move in the direction C indicated in FIG. 3 of the drawings. This movement is transmitted by the ropes, cables or the like 93 to the arms 94 which, in turn, tilt the mowing beams 38 and 45 upwardly. This arrangement for tilting the mowing beams is particularly useful when mowing is conducted in fields of small size in which a relatively large number of maneuvers are normally necessary.

As previously mentioned, the frame 1 can be tilted about the axis of the shaft 66 relative to the coupling member 69. The pin or dowel 80 is normally maintained in the central position shown in FIG. 2 of the drawings but it can, when required, be moved to a position in which the whole of the frame 1 is tilted. Such a working position is very useful when, for example, the tractor 73 is to proceed along substantially level land but is to mow an upwardly or downwardly inclined bank located to one side of the level strip. Such configurations occur at, for example, the sides of ditches, canals and roadways.

The mowing machine which has been described has a large working width but, nevertheless, the driver of the tractor 73 has a good view of both rear mounted mowing beams. Both the mounting of the mowing beams and the drive to their working parts is relatively simple so that the machine operates efficiently and effectively. The leading arm 63 (FIG. 3) has an upright element 102 connected to it. The element 102 curves rearwardly and upwardly away from its point which is located at approximately the level at which crop is to be cut. The movement of the arm 63 which occurs during use of the mowing machine is transmitted to the element 102 which thus acts as a crop separator located in the region of overlap between the two mowing beams 38 and 45. The element 102 has a height of at least 30 centimeters. As can be seen in FIG. 1 of the drawings, swath boards 88 are provided at the relatively remote ends of the two mowing beams 38 and 45.

What we claim is:

1. A mowing machine having a frame and a coupling member for connecting said machine to a prime mover, at least two mowing beams supported on said frame to one side thereof, a first of said beams being positioned laterally of a second of said beams and a parallelogram linkage with substantially vertical pivot means connecting said beams and said frame, whereby one end of each of said mowing beams are adjacent and pivotally interconnected to one another in operative position.

2. The machine of claim 1, wherein said parallelogram linkage includes support means and the adjacent ends of said beams are pivotally connected to said support means.

3. The machine of claim 2, wherein said support means includes two spaced apart horizontal plates with shafts connecting said mowing beams to said plates.

4. The machine of claim 1, wherein said linkage has two longer sides which extend substantially perpendicular to the direction of travel during mowing operation.

5. The machine of claim 4, wherein said mowing beams are held in operative position by yieldable retaining means, said retaining means being articulated with said parallelogram linkage whereby said linkage is displaced and said mowing beams are released to move rearwardly when said machine strikes an obstacle.

6. The machine of claim 1, wherein the first of said mowing beams is located forwardly of the other mowing beam.

7. The machine of claim 6, wherein a driving mechanism is provided for the cutting parts of said mowing beams and said driving mechanism includes transmitting means located adjacent said adjacent ends of said mowing beams.

8. The machine of claim 7, wherein said transmitting means includes a substantially vertical shaft which is rotated during operation.

9. The machine of claim 8, wherein said shaft is disposed between said mowing beams.

10. The machine of claim 9, wherein the upper end of said shaft is connected to a pitman and the lower end of said shaft is connected to mowing blades on said beams.

11. The machine of claim 1, wherein said beams are pivotable about axes which extend substantially parallel to the direction of travel whereby said beams are movable according to the undulations of the ground.

12. The machine of claim 1, wherein support means is pivotally connected to said frame between said mowing beams, said relatively closest ends of said mowing beams being also pivotally connected to said support means.

13. The machine of claim 1, wherein said machine is connected to the three-point lifting device of a tractor and power means is associated with said beams to tilt same upwardly when said lifting device raises said frame.

14. The machine of claim 13, wherein said power means includes a hydraulic pump and a lifting cylinder, said pump operatively associated with said three-point lifting device whereby fluid pressure is supplied to said lifting cylinder when said lifting device is actuated.

15. The machine of claim 14, wherein said lifting cylinder is positioned between said adjacent ends of said beams.

16. The machine of claim 15, wherein said pump includes a cylinder and a co-operating piston, a pivotal arm connecting said mowing beam to said frame, said cylinder and piston being positioned between said frame whereby said arm is pivoted upon the raising of said three-point lifting device.

17. The machine of claim 16, wherein an adjusting mechanism is connected to said mowing beams to tilt said beams about axes extending substantially parallel to said beams whereby the effective cutting heights of said beams are adjusted.

18. The machine of claim 17, wherein said adjusting mechanism includes substantially vertically extending screw-threaded spindles which are turnably mounted in supports on said mowing beams.

19. The mowing machine of claim 1, wherein said frame is pivotable about an axis substantially parallel to the direction of travel, setting means associated with said frame to fix same in any one of a plurality of different angular settings about said axis.

20. The machine of claim 19, wherein a portion of said frame is coupled to support means for said mowing beams, said portion being pivotable relative to a further portion of said frame, said further portion having a coupling member for connection to a three-point lifting device of a tractor.

21. The machine of claim 20, wherein said support means for said mowing beams is pivotable about a substantially vertical axis to enable said mowing beams to be brought to a transport position in which both of them are located to the rear of the tractor.

22. A mowing machine comprising a frame and a coupling member for connecting said machine to a lifting device of a prime mover, mowing beam means supported on said frame to one side thereof in mowing operative position, a parallelogram linkage with substantially vertical pivot means connecting said beam means to said frame, said parallelogram linkage being pivotally movable relative to said frame from a position laterally of said frame to a transport position trailing said frame.

23. The machine of claim 22, wherein said mowing beam means includes two mowing elements that are pivotally connected to a support in said linkage to be located side-by-side relative to one another in operative position and in transport position.

24. The machine claimed in claim 23, wherein said mowing elements are tiltable relative to said support about substantially horizontal axes whereby said elements can be brought to a transport position of reduced width.

25. The machine claimed in claim 24, wherein a retaining member is provided to maintain the mowing elements in their upwardly tilted positions.

26. The machine claimed in claim 24, wherein a separating element is provided adjacent the relatively closest parts of the two mowing elements, said separating element being operatively associated with said mowing elements to perform a vibratory motion during operation of said machine.

27. The machine claimed in claim 26, wherein said separating element has a height of at least 30 centimeters.

28. The machine claimed in claim 26, wherein a driving mechanism is connected to said mowing elements and said separating element is connected to said driving mechanism.

References Cited

UNITED STATES PATENTS

| | | | |
|---|---|---|---|
| 2,989,832 | 6/1961 | Hyman et al. | 56—25 |
| 2,997,835 | 8/1961 | Stewart | 56—25 |
| 3,010,268 | 11/1961 | Freeman | 56—25 |
| 3,066,465 | 12/1962 | Fischer | 56—25 |
| 3,109,272 | 11/1963 | Hedtke | 56—25 |
| 3,177,638 | 4/1965 | Johnson | 56—25 XR |
| 3,262,254 | 7/1966 | Van der Lely et al. | 56—6 |

RUSSELL R. KINSEY, Primary Examiner

U.S. Cl. X.R.

56—25